United States Patent [19]
Salet et al.

[11] 3,809,909
[45] May 7, 1974

[54] SYSTEM FOR THE AUTOMATIC READING OF CURVES

[75] Inventors: Simone Salet, Montrouge; Arnaud De Montgolfier, Paris, both of France

[73] Assignee: G.I.T.A.C., Levallois Perret, France

[22] Filed: June 29, 1973

[21] Appl. No.: 375,290

[30] Foreign Application Priority Data
June 30, 1972 France .............................. 72.23727

[52] U.S. Cl.................. 250/556, 250/227, 250/209
[51] Int. Cl. ............................................ G05b 1/00
[58] Field of Search...... 250/219 DD, 219 QA, 202, 250/231 SE, 209, 208, 227; 235/92 V, 61.11 E

[56] References Cited
UNITED STATES PATENTS

| | | | |
|---|---|---|---|
| 3,403,263 | 9/1968 | Hargens | 250/219 QA X |
| 3,423,589 | 1/1969 | Bardwell et al. | 250/202 |
| 3,566,083 | 2/1971 | McMillin | 250/227 |
| 3,655,948 | 4/1972 | Spauszus | 250/219 DD X |

*Primary Examiner*—Walter Stolwein
*Attorney, Agent, or Firm*—Breitenfeld & Levine

[57] ABSTRACT

A system for the automatic reading of curves plotted on a chart or graph, more particularly tachograph curves of a vehicle as plotted on a tachograph disc. The system may read one or more curves simultaneously. It enables the curve or curves read off to be converted into the form of trains of electrical signals.

6 Claims, 7 Drawing Figures

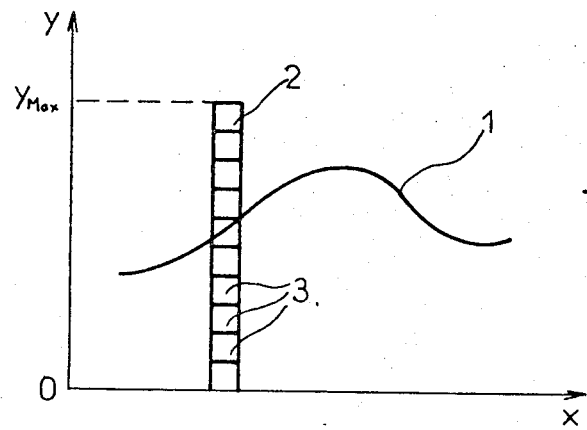
Fig 1
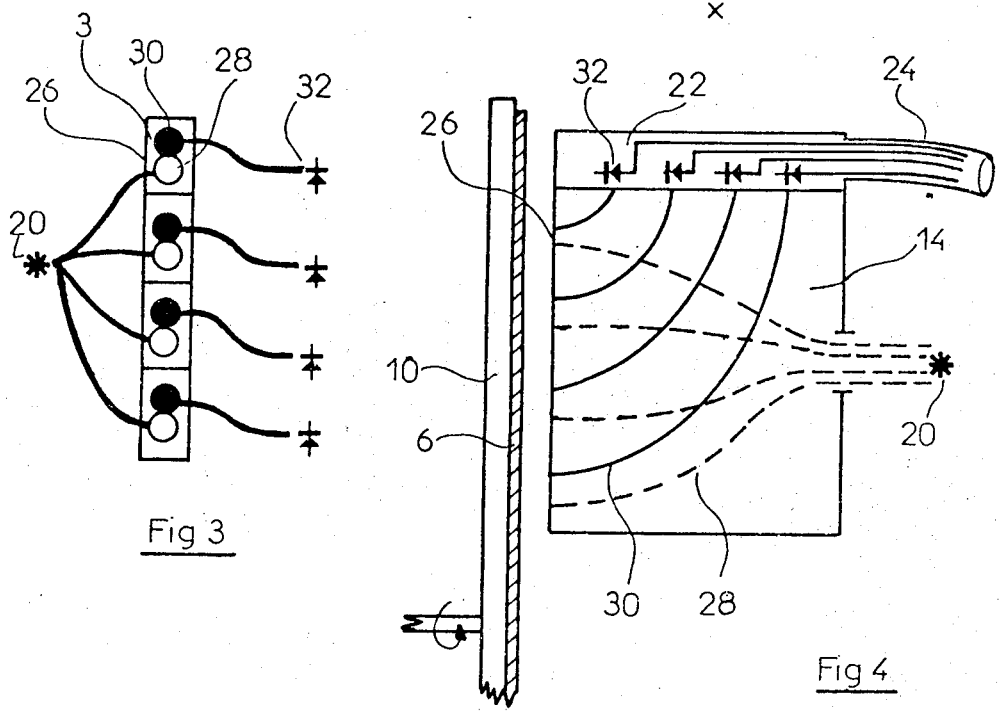
Fig 3
Fig 4

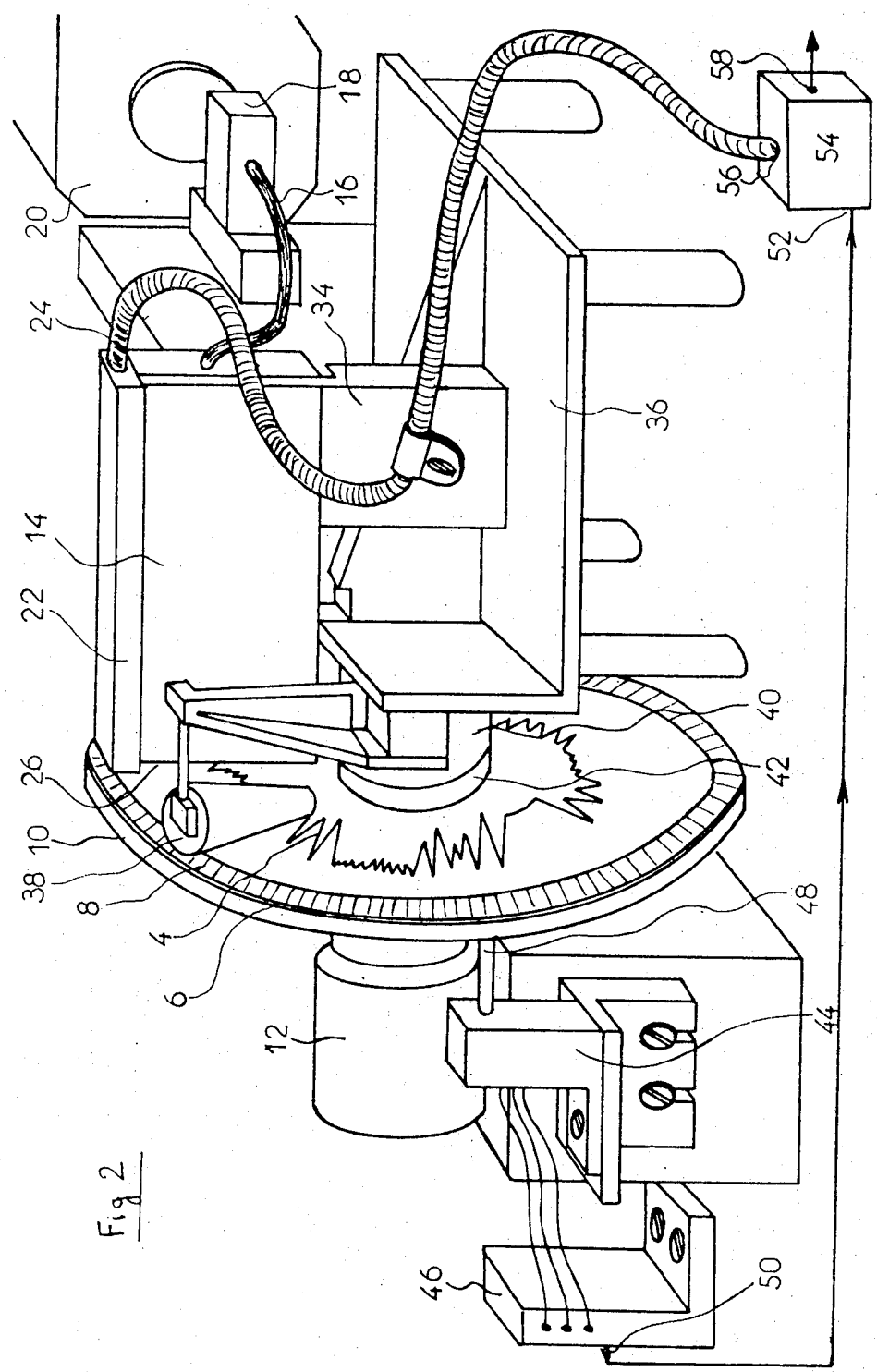

SYSTEM FOR THE AUTOMATIC READING OF CURVES

An object of the invention is to provide such a system suitable for processing information recorded by an automotive vehicle tachograph, more particularly for processing information concerning the vehicle speed recorded on a tachograph disc.

In its reading principle, the system according to the invention makes use of an optical reader assembly of a type already known, comprising an emitter optical fiber bundle and a receiver optical fiber bundle, and another of the objects of the invention is to provide a novel application of this type of optical reader assembly to the specific case of a chart such as a tachograph disc in order to obtain a high-sensitivity system (the curves plotted on a tachograph disc being very fine), of high reliability and satisfying all practical requirements.

For these and other objects the invention provides a system for reading at least one graphically plotted curve on a recording chart, such as a curve plotted with polar coordinates on a circular recording disc, and converting the readings into the form of electrical signals. The system, in one of its aspects as applied to a recording disc, comprises, in combination: a support for said recording disc; drive means for rotating said support and said disc about an axis coincident with the central axis of said disc; means for measuring rotational displacement of said support; a light source; an optical reader assembly comprising an emitter optical fiber bundle having one of its ends disposed facing toward said light source; an assembly of a plurality of photo-electric detectors; a receiver optical fiber bundle disposed with one end facing toward said assembly of photo-electric detectors, said optical fibers of said receiver bundle being divided into a plurality of groups of fibers each of said groups comprising at least one optical fiber, and each of said groups being associated with a different one of said photo-electric detectors; the ends of said fiber bundles which are not disposed facing toward said light source and said photo-electric detectors respectively being combined and disposed facing toward said disc in a row radial to said coincident axes; and means for the sequential analysis of the electrical state of the outputs of said photo-electric detectors, said sequential analysis means being controlled by said means for measuring the displacement of said support.

The invention will be more readily understood from the following description of one embodiment of the invention, which is given by way of example and without limitation. The description refers to the accompanying drawings, wherein:

FIG. 1 is a diagram to illustrate the principle of operation of the system according to the invention;

FIG. 2 illustrates one embodiment of the invention intended more particularly for automatic reading of curves recorded with polar coordinates on a disc;

Figure 5A:
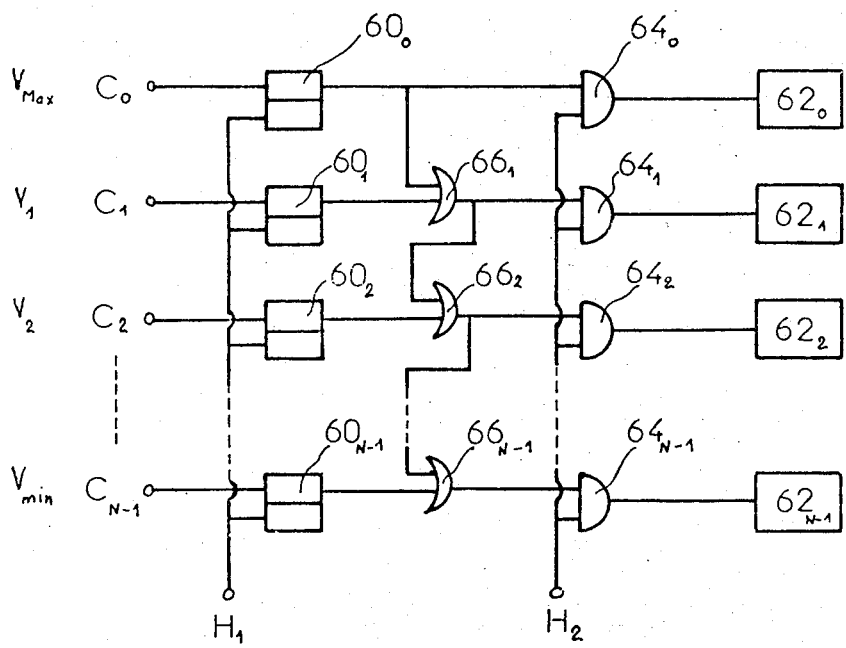
Figure 5B:
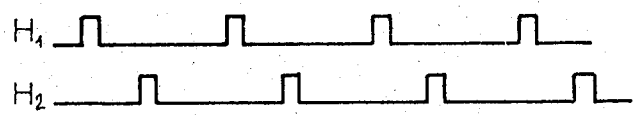
Figure 6:
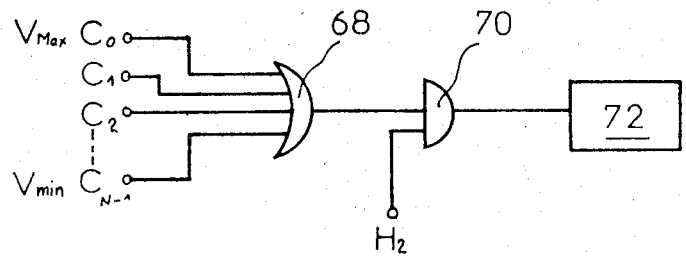

FIGS. 3 and 4 are diagrammatic detail views of a part of the FIG. 2 embodiment and show one specific arrangement of the optical fibers by way of example; and FIGS. 5a, and 5b 6 illustrate electronic circuitry which when used in conjunction with the system according to FIG. 2 and for the specific application to the reading of the recording of a vehicle's speed against time, enables the period during which the vehicle exceeded a given speed to be determined.

The reading principle used in the system according to the invention is illustrated in FIG. 1 in the specific case of a curve recorded with reference to two perpendicular axes, the Y axis OY and the X axis OX. Reading is carried out by sampling the curve 1 at intervals along the axis OX. The smaller the pitch of the sampling intervals, the greater is the reading accuracy. The reader 2 comprises a rectilinear row of reading photo-electric cells 3 disposed side-by-side and aligned in the direction OY. The length $Y_{Max}$ of the reader 2 must be sufficient to cover the entire curve or the portion which it is required to read. Starting from the origin O, the reader 2 moves by successive steps, each of the required interval pitch, while remaining parallel to the axis OY. After each incremental displacement corresponding to one step, the electrical state of each cell 3 is recorded. A modification of the electrical signal transmitted by a cell identifies the presence of a line of the curve localized opposite said cell. A series of electrical signals characteristic of the curve are obtained in this way. The curve 1 can of course be recorded in polar coordinates, for example, on a circular recording disc, instead of the rectangular coordinates OX, OY, the center of the polar coordinates corresponding to the disc center. An example is the recording of the speed/time graph of an automotive vehicle by means of a recording tachograph mounted in the vehicle. In this specific case, the disc generally performs one complete revolution in twenty four hours. Graphs other than speed graphs may be recorded, for example the driver's driving and rest times and the vehicle running time. In every type of recording, the curve is read by moving the reader 2 in relation to the support on which the curve is plotted, or conversely by moving the support relatively to the reader, in the same direction as the direction of recording. The row of photo-electric cells 3 is perpendicular to this direction of recording.

The embodiment shown in FIG. 2 is used for reading polar coordinate curves recorded on a support in the form of a disc.

The curve 4 which is to be read automatically is plotted on a circular disc 6, the curve 4 for example representing the speed/time graph of a vehicle, e.g. a truck, recorded by a tachograph device mounted in the truck. Such recording tachographs are well known and it is unnecessary to give further details herein. The graduations 8 at the edge of the disc 6 are time graduations and enable the speed graph to be located in time, for example during twenty four hours. The disc 6 is supported on a support 10 shown in the form of a circular disc in FIG. 2. In this case, the centre of said support 10 coincides with the center of said disc 6, which is of course the origin of the polar coordinates used for the recording of the curve 4. The support 10 may be moved by rotational displacement means in the same direction as the direction or recording of the curve 4. In the embodiment shown in FIG. 2, the displacement means comprise a motor 12 which rotates the support 10 about its axis. An optical reader 14 situated facing toward the disc 6 consists essentially of an emitter optical fiber bundle 16, one of the ends of which is held by a bracket 18 so as to face toward a light source 20. Said light source may be an incandescent lamp or an electro-luminescent diode, but is is more advantageous to use a laser, preferably of the helium-neon or ionized argon type. The optical reader 14 also comprises a receiver optical fiber bundle. The fibers of the receiver bundle are divided into a plurality of groups, one of the two ends of each optical fiber of the same group being disposed facing toward a photo-electric detector forming part of a detector assembly. Said detector assembly is disposed within a casing 22, the output leads of the various detectors being contained within a sheath 24. The optical fibers of the reader 14 are disposed inside a casing and are therefore not visible in FIG. 2. The sensitive surface of the reader 14 facing toward said disc 6 is designated by numeral 26 in FIG. 3.

Referring to FIG. 3, said sensitive surface 26 of the optical reader 14 is formed by a row of emitter optical fibers 28 and receiver optical fibers 30. An assembly comprising at least one emitter fiber and at least one receiver fiber forms a reading cell 3, also shown in FIG. 1. The emitter optical fibers are disposed with their other ends, i.e. the ends which are not facing the disc 6, disposed facing the light source 20 (FIG. 2). The other end of each receiver fiber 30, i.e. the end which is not facing the disc 6, is disposed facing a photo-electric detector 32. The reading cell 3 may comprise a plurality of receiver fibers 30. In that case, the fibers of one cell form a group of fibers associated with a single photo-electric detector 32. In FIG. 3, the arrangement of the optical fibers on the sensitive surface 26 of the optical reader 14 is only one exemplified embodiment. All the fibers could, for example, be adjacent and the numbers of optical fibers both per cell 3 and per row may be different. Also, if it is required to read a plurality of different curves automatically, each curve may be associated with an optical reader 14 having its own characteristics, number of fibers and spacing between each fiber, depending upon the characteristics of the curve to be read.

FIG. 4 shows a specific arrangement of the optical fibers inside the casing forming the outer cover of the optical reader 14. One of the two ends of each optical fiber is disposed facing the disc 6 to form the sensitive surface 26 of the reader. The other ends of the emitter and receiver optical fibers are disposed facing the light source 20 and facing the assembly 22 of photo-electric detectors 32, respectively.

In the specific embodiment shown in FIG. 2, the optical reader 14 is fixed on a support comprising a rigid member 34 and a table 36. The table also supports two frusto-conical rollers 38, situated on either side of the sensitive surface 26 of the optical reader. These rollers hold the disc 6 in firm contact with the surface of the support 10 in front of the sensitive surface 26 of the optical reader. The table 36 also supports two coaxial cylindrical members 40 and 42 whose common axis coincides with the center of the polar coordinates of the curve 4 and with the axis of rotation of the circular support 10. The member 40 is fixed rigidly to the table 36 while the member 42 can turn freely about its axis. To position the disc 6 on the support 10, the table 36 is moved away and the disc 6 is applied to the surface of the support 10. Means may be provided to position the disc automatically. For reading purposes, the movable cylindrical member 42 and the frusto-conical rollers 38 are brought into contact with the disc 6. When the disc 10 is rotated by the motor 12, the cylindrical member 42 and the rollers 38 turn with the disc 6. Means may be provided for automatically driving the disc 6 in synchronism with the rotation of the support 10 after the disc has been introduced and positioned on the support.

A gearwheel (not shown in FIG. 2) is secured to the support 10 coaxial therewith. The teeth of the gearwheel are regularly spaced and are similar to the lines of a grating. An auxiliary optical reader device 44 provided with a window situated facing the gear rim delivers electrical pulses when the teeth of the wheel pass in front of said window. The auxiliary system acts as an electronic time base having an adjustable frequency, i.e. a generator of electrical signals whose frequency is proportional to the speed of rotation of the support 10. This time base is represented in FIG. 2 by said auxiliary optical reader 44 and by a time signal generator 46. The reader 44 comprises a reading head 48 consisting essentially of an emitter optical fiber bundle disposed between two receiver optical fiber bundles. These emitter and receiver optical fiber bundles enter the time signal generator 46. The emitter fiber bundle is associated with a light source, such as an electro-luminescent diode, and each receiver fiber bundle is associated with a photo-electric detector. These two detectors are connected inside the time signal generator 46 to electronic means delivering a time signal at the output 50 of the generator 46 whenever a tooth of the gearwheel passes in front of the window of the reading head 48. This auxiliary line reader and counter system measures the rotational displacement of the support 10. The time signals from the generator 46 are applied to an input 52 of means 54 for the sequential analysis of the electric state of the outputs of the photo-electric detectors 32. The output leads of these detectors, contained within the sheath 24, are connected to another input 56 of the sequential analysis means 54. For each time signal pulse entering the input 52, the means 54 sequentially scan the electrical state of the photoelectric detectors 32 and deliver at their output 58 a series of electrical signals characteristic of the curve. These sequential analysis means 54 are used conventionally in electronic systems and will not therefore be described in greater detail herein. Analysis of the curve 4 is of increasing accuracy as the sampling pitch diminishes, i.e. as the distance between two successive teeth of the gearwheel decreases. Hence the degree of accuracy of the analysis can be adjusted by selecting gearwheels of appropriate tooth pitch.

The series of pulses characteristic of the curve under analysis may be used for numerous applications. More particularly, FIGS. 5 and 6 describe electronic means coupled to the system shown in FIG. 2 to determine the time spent by a vehicle — in the case of analysis of a speed/time graph — at a speed greater than or equal to a predetermined speed.

Let is be assumed that the speeds of a vehicle are of interest in a speed range between two values $V_{Max}$ and $V_{min}$. Between these maximum and minimum values there is an entire speed range which is monitored in sections, each section corresponding to one of the reading cells 3 and hence to one of the photo-electric detectors 32. Referring to FIG. 5a, the outputs of these detectors are represented by $C_0, C_1 \ldots, C_{N-1}$, assuming that there are N reading cells, and hence that the speed range under supervision ($V_{Max} - V_{min}$) is divided into N sections. The electronic means shown in FIG. 5a and associated with the system shown in FIG. 2 indicate for each speed interval under consideration the time during which the vehicle moved at a speed within that interval. If it is assumed, for example, that the vehicle travelled at the speed $V_2$ in FIG. 5a a signal appears corresponding to a logic state 1 solely at the input $C_2$, the other inputs $C_0$, $C_1$, $C_3$ . . . $C_{N-1}$ being at the logic state 0. Each input C is connected to one of the two inputs of a bistable 60 of the type D, the second input receiving the time signals $H_1$, for example from generator 46. The output of a type D bistable assumes a logic state 1 when its two inputs are at a logic state 1 and retains this position until the next time signal appears at one of its inputs. Each bistable 60 is connected to the input of a counter 62 by means of an AND gate 64 processing time signals $H_2$, applied to its second input. These time signals $H_2$, of the same frequency as the time signals $H_1$, are offset in time in relation to the signals $H_1$ as shown in FIG. 5b. Between the output of the bistable 60 and the AND gate 64 for a section of speeds V under consideration, there is an OR gate 66, the second input of this gate being connected to the output of the OR gate associated with the next higher speed section. The operation of these electronic means is as follows. When a pulse appears at one of the inputs C of a speed section under consideration, the counter 62 associated with that speed section advances by one step, and the same applies to all the counters of the speed sections lower than the speed under consideration. For example, if a pulse appears at the input $C_1$, the counters $62_1$, $62_2$ . . . . . $62_{N-1}$ advance by one step. The output of the bistable $60_1$ passes to a logic state 1 when the time signal $H_1$ appears at its input. This logic state 1 is transmitted via the OR gate $66_1$ to one of the two inputs of the AND gate $64_1$. By means of the OR gate $66_2$, $66_3$ . . . . $66_{N-1}$, this logic state 1 will also be present at the corresponding inputs of the AND gates $64_2$ . . . $64_{N-1}$. The logic state 1 is recorded by counters $62_1$, $62_2$, . . . $62_{N-1}$ when the time signal $H_2$ following the time signal $H_1$ appears at the input of the AND gates 64. When analysis of the curve has been completed, a histogram of the vehicle speeds can thus be restored by checking the state of the counters 62.

When all that is required to be known is the time spent by the vehicle at a speed equal to and greater than $V_{min}$, the electronic means to be used in conjunction with the system shown in FIG. 2 are illustrated in FIG. 6. These electronic means comprise solely an OR gate having N inputs each connected to one of the outputs C of the photo-sensitive detectors 32. The output of the OR gate 68 is connected to one of the two inputs of an AND gate 70, the second input receiving the time signal $H_2$ or $H_1$. A counter 72 is connected to the output of the AND gate 70.

The invention is not limited solely to the embodiment illustrated and described by way of example. More particularly, the arrangement of the emitter and receiver optical fibers illustrated in FIGS. 3 and 4 is only an exemplified embodiment. The system shown in FIG. 2 enables curves recorded in polar coordinates to be read, but it is obvious that a system according to the invention may also read curves recorded with cartesian coordinates since all that is required is to replace the means for rotating the curve 4 in front of the sensitive surface 26 of the optical reader 14 by means for rectilinear displacement of the curve in a direction parallel to the direction of recording. The optical reader 14 may also be formed by a number of rectilinear rows of emitter and receiver optical fibers which may or may not alternate.

What we claim as our invention and desire to secure by Letters Patent is:

1. A system for reading at least one curve plotted with polar coordinates on a circular recording disc and converting the readings into the form of significant electrical signals, said system comprising in combination: a support for said recording disc; drive means for rotating said support and said disc about an axis coincident with the central axis of said disc; means for measuring rotational displacement of said support; a light source; an optical reader assembly comprising an emitter optical fiber bundle having one of its ends disposed facing toward said light source; an assembly of a plurality of photo-electric detectors; a receiver optical fiber bundle disposed with one end facing toward said assembly of photo-electric detectors, said optical fibers of said receiver bundle being divided into a plurality of groups of fibers each of said groups comprising at least one optical fiber, and each of said groups being associated with a different one of said photo-electric detectors; the ends of said fiber bundles which are not disposed facing toward said light source and said photo-electric detectors respectively being combined and disposed facing toward said disc in a row radial to said coincident axes; and means for the sequential analysis of the electrical state of the outputs of said photo-electric detectors, said sequential analysis means being controlled by said means for measuring the displacement of said support.

2. A system according to claim 1, in which said measuring means comprise: a grating composed of lines connected to said support; an auxiliary reader comprising an emitter optical fiber bundle, two receiver optical fiber bundles, a light source, two photo-electric detectors; and electronic means coupled to said photo-electric detectors for measuring relative displacement of said grating and said auxiliary reader by line counting.

3. A system according to claim 2 in which said line grating is in the form of a gearwheel coaxial with said support and driven so as to rotate therewith.

4. A system according to claim 1 which also comprises means for selectively detecting the state of excitation of the ends of said groups of fibers of said receiver bundle according to the position of said ends of said groups of fibers in relation to said radial direction.

5. A system according to claim 4 in which said selective detection means comprise logic gates operatively coupled to said photo-detectors and to at least one time signal source, the logic outputs of said logic gates actuating at least one counter.

6. A system for reading at least one graphically plotted curve on a recording chart and converting the readings into the form of significant electrical signals, said system comprising, in combination: a support for said recording chart; drive means for displacing said support and said chart in the direction of one of the coordinates of the curve; means for measuring displacement of said support; a light source; an optical reader assembly comprising an emitter optical fiber bundle having one of its ends facing toward said light source; an assembly of a plurality of photo-electric detectors; a receiver optical fiber bundle disposed with one end facing toward said assembly of photo-electric detectors, said optical fibers of said receiver bundle being divided into a plurality of groups of fibers each of said groups comprising at least one optical fiber, and each of said groups being associated with a different one of said photo-electric detectors; the ends of said fiber bundles which are not disposed facing toward said light source and said photo-electric detectors respectively being combined and disposed facing toward said chart in a row transverse to the direction of displacement of said support and said chart; and means for the sequential analysis of the electrical state of the outputs of said photo-electric detectors, said sequential analysis means being controlled by said means for measuring the displacement of said support.

* * * * *